United States Patent
Arage

(10) Patent No.: US 9,470,777 B2
(45) Date of Patent: Oct. 18, 2016

(54) RADAR SYSTEM FOR AUTOMATED VEHICLE WITH PHASE CHANGE BASED TARGET CATAGORIZATION

(71) Applicant: Delphi Technologies, Inc., Troy, MI (US)

(72) Inventor: Alebel Hassen Arage, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/854,929

(22) Filed: Sep. 15, 2015

(65) Prior Publication Data

US 2016/0084943 A1    Mar. 24, 2016

Related U.S. Application Data

(63) Continuation-in-part of application No. 14/491,192, filed on Sep. 19, 2014.

(51) Int. Cl.

| | |
|---|---|
| *G01S 7/41* | (2006.01) |
| *G01S 13/44* | (2006.01) |
| *G01S 7/35* | (2006.01) |
| *G01S 13/42* | (2006.01) |
| *G01S 13/58* | (2006.01) |
| *G01S 13/72* | (2006.01) |
| *G01S 13/93* | (2006.01) |
| *G01S 13/50* | (2006.01) |
| *G01S 13/52* | (2006.01) |

(52) U.S. Cl.
CPC .................. *G01S 7/41* (2013.01); *G01S 7/354* (2013.01); *G01S 7/414* (2013.01); *G01S 13/42* (2013.01); *G01S 13/4454* (2013.01); *G01S 13/584* (2013.01); *G01S 13/726* (2013.01); *G01S 13/931* (2013.01); *G01S 13/50* (2013.01); *G01S 13/52* (2013.01)

(58) Field of Classification Search
CPC .......... G01S 7/41; G01S 7/354; G01S 7/414; G01S 13/50; G01S 13/52; G01S 13/4454; G01S 13/931
USPC ........ 342/70–72, 89, 90, 94, 95, 98, 99, 102
See application file for complete search history.

(56) References Cited

U.S. PATENT DOCUMENTS

| | | | | |
|---|---|---|---|---|
| 4,563,686 A | * | 1/1986 | Boles .................. | G01S 13/9023 342/179 |
| 4,630,051 A | * | 12/1986 | Adams ................ | G01S 15/8979 342/133 |

(Continued)

*Primary Examiner* — Peter Bythrow
(74) *Attorney, Agent, or Firm* — Lawrence D. Hazelton

(57) ABSTRACT

A radar system suitable for an automated vehicle includes a plurality of antennas configured to detect a reflected radar signal reflected by an object in a field-of-view of the system. Each antenna of the plurality of antennas is configured to output detected signals indicative of the reflected radar signal detected by each of the plurality of antennas. The system also includes a controller configured to receive the detected signals from the plurality of antennas, determine if the object is present in the field-of-view based on the detected signals, and determine a phase-difference between symmetrical-frequency-bins for each antenna. The symmetrical-frequency-bins are symmetrically offset from a maximum-amplitude non-coherent-integration detection-frequency-bin (max-NCI-bin). The controller is further configured to determine a classification of the object based on a time-domain-analysis of the phase differences across the plurality of antennas.

3 Claims, 13 Drawing Sheets

(56) References Cited

U.S. PATENT DOCUMENTS

| | | | | |
|---|---|---|---|---|
| 6,040,795 | A * | 3/2000 | Watanabe | G01S 13/931 342/70 |
| 6,538,599 | B1 * | 3/2003 | David | G01S 7/2926 342/104 |
| 7,190,305 | B2 * | 3/2007 | Isaji | G01S 7/354 342/107 |
| 7,474,262 | B2 * | 1/2009 | Alland | G01S 7/288 342/101 |
| 7,561,099 | B2 * | 7/2009 | Wakayama | G01S 3/46 342/368 |
| 7,639,171 | B2 * | 12/2009 | Alland | G01S 7/034 342/171 |
| 2008/0129582 | A1 * | 6/2008 | Hsieh | G01S 13/34 342/94 |
| 2008/0165049 | A1 * | 7/2008 | Wakayama | G01S 3/46 342/91 |
| 2010/0007547 | A1 * | 1/2010 | D'Addio | G01S 13/003 342/120 |
| 2010/0075618 | A1 * | 3/2010 | Isaji | G01S 13/345 455/90.1 |
| 2013/0127655 | A1 * | 5/2013 | Kishigami | G01S 7/288 342/152 |
| 2016/0084941 | A1 * | 3/2016 | Arage | G01S 7/41 342/91 |
| 2016/0084943 | A1 * | 3/2016 | Arage | G01S 7/41 342/102 |

* cited by examiner

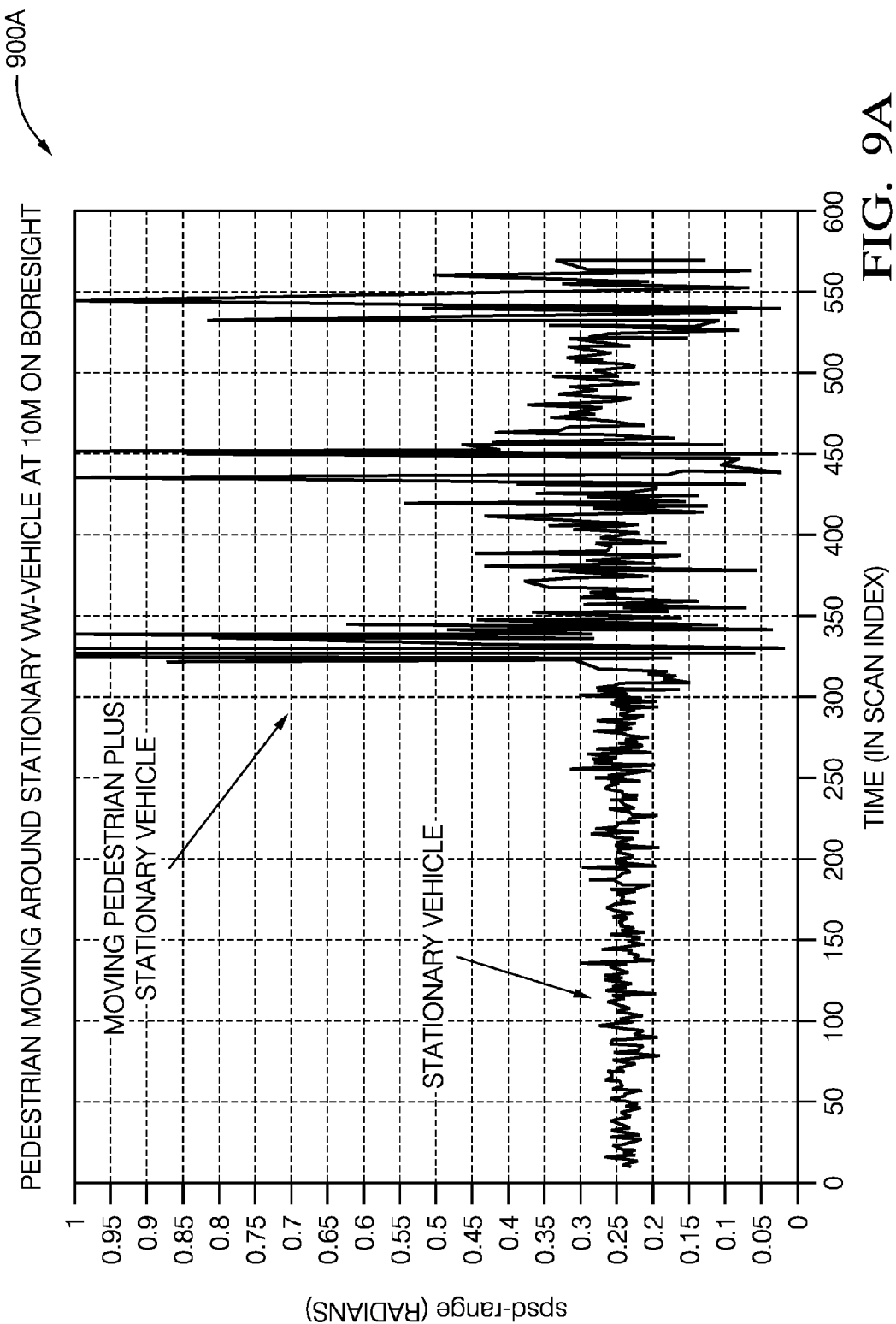

RADAR SYSTEM FOR AUTOMATED VEHICLE WITH PHASE CHANGE BASED TARGET CATAGORIZATION

CROSS-REFERENCE TO RELATED APPLICATION

This application is a continuation-in-part application and claims the benefit of U.S. patent application Ser. No. 14/491,192, entitled RADAR SYSTEM WITH PHASE BASED MULTI-TARGET DETECTION, and filed on 19 Sep. 2014, the entire disclosure of which is hereby incorporated herein by reference.

TECHNICAL FIELD OF INVENTION

This disclosure generally relates to a radar system, and more particularly relates to a system that determines if a target includes more than one object based on a time-domain-analysis of the phase differences across the plurality of antennas.

BACKGROUND OF INVENTION

Because of system size, technology, and cost constraints, automotive radar sensors may have performance limitations with regard to discriminating two objects that have similar position and Doppler shift characteristics, or if one object has a substantially larger Radar Cross Section (RCS) than a second nearby object. Examples of two objects with similar range and Doppler shift reflection characteristics that typical automotive radar systems have difficulty discerning include: a slowly moving pedestrian walking around stationary or slowly moving passenger vehicle, a motor cycle traveling beside a tractor-trailer traveling in an adjacent lane at a similar range and range rate, and two passenger cars moving close to each other on adjacent lanes with similar range rates.

Automotive radar is used as a sensor for partially automated or fully autonomous operation of vehicles. Depending on angular-resolution requirements of these features, a wide-beam, or relatively narrow-beam transmit and receive antenna(s) or antenna-array(s) may be used, depending on the selected scanning concept (i.e. mechanical or electronics) across a given field-of-view. The transmit antenna radiates Radio Frequency (RF) signal that propagates toward an object in the radar field-of-view. The radio frequency signal is typically a pulse compressed waveform such as a series of waveform pulses commonly called 'chirps' or Frequency Modulated Continuous Wave, Pulse-Doppler and Frequency Shift Key. The signals reflected by the object depend on a backscatter property (i.e. Radar Cross Section) of the object. The signals reflected by the object are received by receiving antenna-array elements, which are typically connected to single (i.e. time-multiplexed) or multiple (i.e. not time-multiplexed) signal conditioning and processing devices. Depending on the selected receiver techniques (i.e. homodyne or heterodyne), the received RF-signal is converted to discreet baseband signal during propagation through signal conditioning devices chain. For a series of waveform pulses, the baseband signal is transferred from the base time-domain to a Range-Doppler frequency domain by a digital signal processing (or DSP) device, as will be recognized by those in the art. The amplitude of Range-Doppler spectrums from all of the receive antenna-array elements are averaged (i.e. non-coherently integrated). Prior automotive radar systems use this non-coherently integrated amplitude spectral profile as the basis for an object detection schema, i.e. a NCI-detection schema. The systems determine the NCI-spectrums for position and Doppler parameter estimation of detected objects which are characterized by a spectral-amplitude greater than a predetermined detection threshold. The NCI-detection technique is advantageous as it suppresses system noise variance, so keeps noise caused false-alarm rates to a minimum. The NCI-detection technique provides a net Signal-to-Noise Ratio (SNR) gain as system noise is less correlated across the antenna-array elements compared to the object reflected signal. Detected objects or targets are then selected for tracking. The tracker applies various tracking algorithms to evaluate and weight any time-dependent quantitative behaviors of object parameters to make a reliable determination for object recognition and classification.

U.S. Pat. No. 7,639,171 entitled RADAR SYSTEM AND METHOD OF DIGITAL BEAM FORMING describes a radar system that uses non-coherently integrated amplitude spectral profile as the basis for an object detection schema. Detection performance of such amplitude spectrum based NCI-detection schema can be affected by dissimilar interference and coupling effects across receive antenna-array elements. For example, measurement resolution, which is basically determined by the waveform parameters setup, degrades due to interference and coupling effects on the signal spectrum shape. This makes the detection and categorization or classification of multiple near-to-each-other scattering centers difficult. This is particularly true for single targets with multiple or extended scattering centers with similar or different Doppler and reflection characteristics (or Radar Cross Sections, RCS). Typically, the reflected signal from a scattering center with a larger RCS could distort and mask signal from another nearby scattering center with a smaller RCS, which makes object classification difficult. Nearby scattering center detection/distinction is an important step to achieve secondary target discrimination and primary target categorization/classification of various on-road object groups such as: stationary-object, moving-bicyclist, moving-pedestrian, and moving-other-vehicle. The target categorization/classification may also include a determination of relative travel direction such as: longitudinal, lateral or diagonal.

General performance limitations of an amplitude based NCI-detection technique can be improved by proper waveform parameter specification, and narrow beam antenna or antenna-array design. However, this may undesirably increase sensor size, cost, and signal processing complexity. That is, these factors are trade-offs for high resolution radar performance which impose restrictions on any arbitrary radar systems design. That means, a radar system configured with only an amplitude spectrum based NCI-detection technique has limited capability of object discrimination and categorization. An example of such a system is described in U.S. patent application Ser. No. 14/491,192 entitled RADAR SYSTEM WITH PHASE BASED MULTI-TARGET DETECTION and filed 19 Sep. 2014 by the same inventor of the system described herein. That disclosure describes a local phase-spectrum evaluation technique for automotive radars in order to improve performance limitation of near targets detection and discrimination of the detection schema using amplitude spectrum peak detection and evaluation technique. Note that object categorization/classification is the process of dividing detected objects into groups of entities whose parameters are in some way similar to each other. For example, a slowly moving pedestrian or a bicyclist can be categorized together and distinguished from a moving other-vehicle or a stationary on-road object.

SUMMARY OF THE INVENTION

The system described herein provides for a phase-spectrum derived object parameters that can be utilized by a tracker module as additional source of information for supporting object categorization/classification. As used herein, the term phase-spectrum refers to the phase spectrum component of a radar return signal. The radar object tracking and classification module of the system is improved because in addition to the detected object parameters list considering amplitude spectrum derived parameters (i.e. objects lateral and longitudinal position, range rate, amplitude), the improved system described herein considers phase-spectrum derived parameters such as the slope of the local phase spectrum differences of a detected object and/or the slope variance with time.

When multiple near scattering centers of an object or objects are present, reflected signals from each scattering center interfere with reflected signals from other scattering centers at the receiver antenna. The amount of interference depends on relative phase difference between the signals from these scattering centers. Relative phase difference is the result of relative position and/or rate of change of position difference between scattering centers with respect to the receive antenna position and/or its rate of change of position, respectively. That means that antenna-array elements could experience dissimilar interference characteristics of signals from these scattering centers due to the fact that relative phase difference changes across distributed (uniformly or non-uniformly) antenna-array elements. This produces different range-Doppler amplitude and phase-spectrum profiles across receive antenna-array elements.

As it is a matter of interference between signals reflected from scattering centers located in relative close proximity to each other, relative phase difference between signals can be directly evaluated in the frequency domain local to the superposed signal frequency bin. A phase difference is calculated between the first symmetrical frequency bins to the superposed signal detection frequency bin. By the first symmetrical frequency bins means the frequency bins those are one frequency bin away from the superposed signal detection frequency bin to the plus and minus direction (i.e. +/−1 bin away). The estimated phase difference converges to a minimum value (or zero) if the detected signal is from a single point scattering center. This is because the signal spreads (amplitude and phase-spectrums) uniformly to symmetrical neighboring frequency bins for a signal that is weighted in the time domain by symmetrical window coefficients about its maximum at the center. In the case of interference of signals reflected from multiple near-each-other scattering centers, these first symmetrical frequency bins likely contain unequal signal amplitude and phase values because the scattering centers possess relative position differences and/or rate of change of position differences as those are un-centered to a specific dominant scattering center. That means phase difference between these first symmetrical frequencies bins does not necessarily converge to a minimum value as it was the case for single point scattering center.

For antenna-array configurations, the averaging of these phase differences across the antenna-array elements provides a robust phase difference value that can be used to distinguish single point and multiple near scattering center(s). As discussed, there is also phase difference variation across antenna-array elements due to the fact that relative position and/or rate of change of position differences of scattering centers are not equal for a distributed antenna-array configuration. Therefore, evaluating the slope or the variance of the slope of the phase difference across antenna-array elements can also be employed to identify between single point and multiple near scattering centers.

Note that such local phase-spectrum evaluation technique by itself doesn't provide a parameter estimation of scattering centers as is the case for other detection and discrimination techniques. However, it is more sensitive to provide indications about the detected object or target by indicating if the reflection is from a single scattering center or multiple near scattering centers. This technique is used as an indicator for single versus multiple near scattering centers in order to activate various controlled parameter estimation techniques.

The system describe herein improves on the prior technique described above to better support radar tracking and object categorization techniques. Depending on radar object geometry and motion profile, the slope and/or the variance of the slope of local phase difference across antenna-array elements will fluctuate in the time domain. This is because scattering centers move with respect to the position of antenna-array elements and produce scatter signals indicative of non-stationary scattering centers, i.e. objects. That means observing slope of the local phase difference across antenna-array elements should provide a hint about target's geometry and its motion profile if local phase-spectrum evaluation is performed across the range and Doppler frequency domains.

Determining the slope or the variance of the slope of local phase differences in the detection parameters list provides additional information that can be utilized by the tracker algorithms for object categorization according to the various on-road object groups. Prior examples of the tracker algorithms use a standard object parameters list in order to analyze their time-domain quantitative behaviors and make prediction on instantaneous object kinematics and its category or class. Examples of standard object parameters are signal amplitude, lateral and longitudinal positions and their rate-of-change of positions. These object parameters are derived from amplitude spectrum, and can be easily affected by interfering signals from multiple near-each-other scattering centers. Adding an analysis over time of the slope and/or the variance of the slope of the local phase difference in to the object parameters list will help the tracker determine additional supportive information about object size and motion profiles.

In accordance with one embodiment, a radar system suitable for an automated vehicle is provided. The system includes a plurality of antennas configured to detect a reflected radar signal reflected by an object in a field-of-view of the system. Each antenna of the plurality of antennas is configured to output detected signals indicative of the reflected radar signal detected by each of the plurality of antennas. The system also includes a controller configured to receive the detected signals from the plurality of antennas, determine if the object is present in the field-of-view based on the detected signals, and determine a phase-difference between symmetrical-frequency-bins for each antenna. The symmetrical-frequency-bins are symmetrically offset from a maximum-amplitude non-coherent-integration detection-frequency-bin (max-NCI-bin). The controller is further configured to determine a classification of the object based on a time-domain-analysis of the phase differences across the plurality of antennas.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 6A, 6B, 7A, 7B, 8A, 8B, 9A, and 9B are graphs of data from the system of FIG. 1 in accordance with one embodiment.

DETAILED DESCRIPTION

Figure 1:
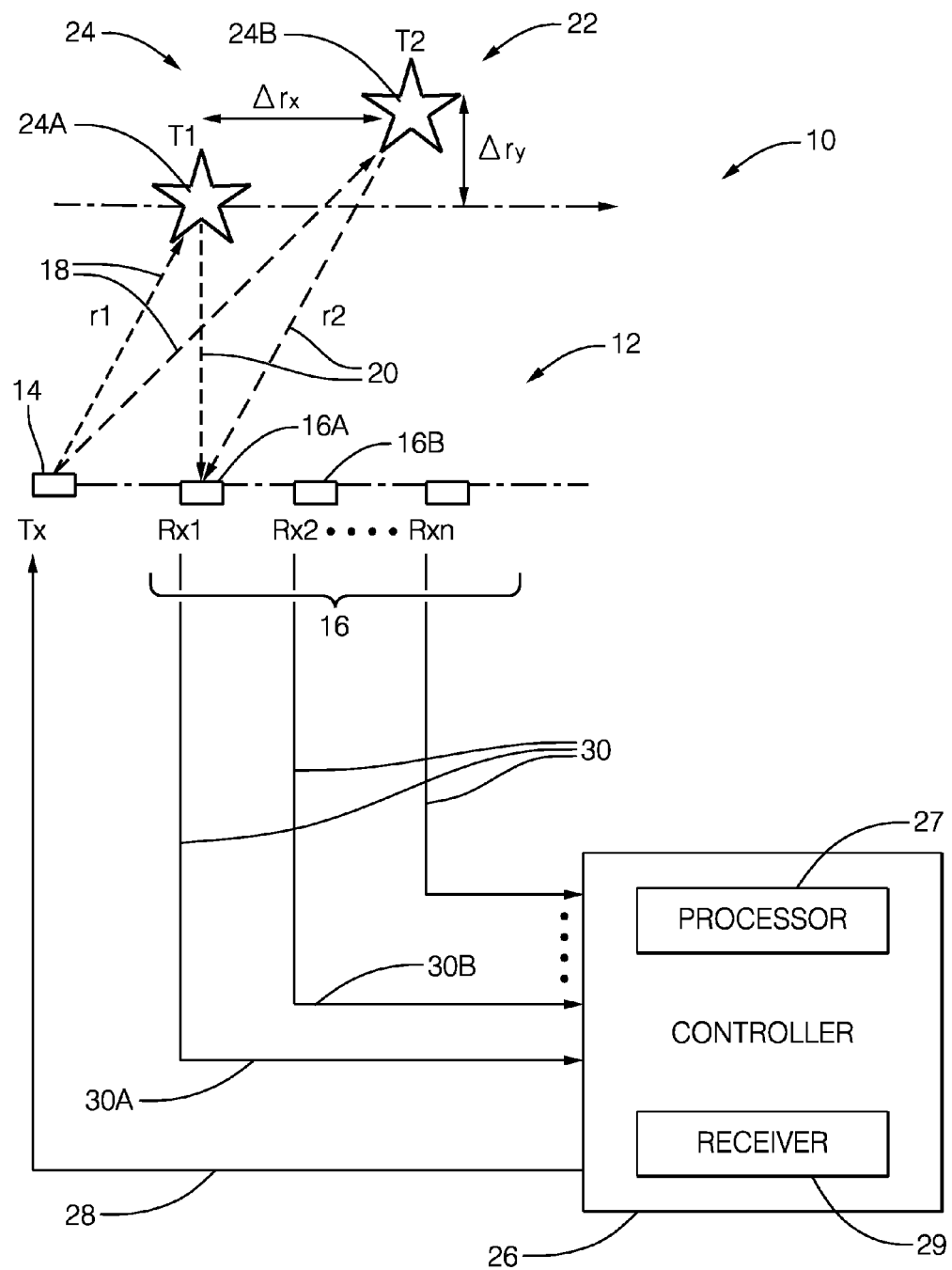
FIG. 1 is a diagram of a radar system in accordance with one embodiment.

FIG. 1 illustrates a non-limiting example of a radar system, hereafter referred to as the system 10. The system 10 includes an antenna array 12 that may include a transmit-element 14, and an array of receive elements, hereafter referred to as a plurality of antennas 16. It is recognized that one or more of the antenna elements that make up the antenna array 12 could be used to both transmit a radar signal 18, and output a detected signal 30 indicative of reflected radar signals 20 reflected by a first object 24A or a second object 24B in a field-of-view 22 of the system 10. The transmit-element 14 and the plurality of antennas 16 are illustrated as distinct elements in this example only to simplify the explanation of the system 10.

The system 10 may also include a controller 26 configured to output a transmit-signal 28 to the transmit-element 14, and configured to receive detected signals 30 from each antenna, for example a first signal 30A from a first antenna 16A and a second signal 30B from a second antenna 16B. Each of the detected signals 30 correspond to the reflected radar signal 20 that was detected by one of the plurality of antennas 16. The controller 26 may include a processor 27 such as a microprocessor, digital signal processor, or other control/signal conditioning circuitry such as analog and/or digital control circuitry including an application specific integrated circuit (ASIC) for processing data, as should be evident to those in the art. The controller 26 may include memory (not shown), including non-volatile memory, such as electrically erasable programmable read-only memory (EEPROM) for storing one or more routines, thresholds and captured data. The one or more routines may be executed by the processor 27 to perform steps for determining if the detected signals 30 received by the controller 26 indicate the presence of the first object 24A and/or the second object 24B, as described herein.

To meet customer specified angular-resolution requirements of automotive radar systems, such systems often use antennas that have relatively narrow transmit and receive beam-widths to scan a field-of-view for objects. In this non-limiting example, the transmit-element 14 radiates or emits the radar signal 18 toward the first object 24A and/or the second object 24B in a field-of-view 22, and each of the plurality of antennas 16 detects a reflected radar signal reflected by the first object 24A and/or the second object 24B in the field-of-view 22 of the system 10. Characteristics of the reflected radar signal 20 depend on a backscatter property or radar cross section (RCS) of the first object 24A or the second object 24B. The characteristics also depend on distance, direction, and relative motion of the first object 24A and/or the second object 24B relative to the antenna array 12, which influences the Doppler shift of the reflected radar signal 20. Depending on the signal waveform and the modulation system used, the controller 26 may transform the time domain signals (the detected signals 30) to the frequency domain so, for example, the spectrums can be combined using, for example, non-coherent integration (NCI). Some automotive radar systems use this non-coherently integrated spectral data as the basis for object detection, and evaluate the spectral data to determine the position and Doppler parameter estimates that have higher spectral magnitude than a defined detection threshold. NCI is generally preferred to suppress noise induced variation and thereby keep noise induced false alarm rates to a minimum.

If multiple objects are present in the field-of-view 22, the reflected radar signal 20 may interfere with each other depending on the relative position and/or range rate difference between the objects with respect to the receive antennas (the plurality of antennas 16). A relative position difference between the first object 24A and the second object 24B is illustrated as Δrx and Δry and may be exhibited in terms of a relative phase difference between the reflected radar signal 20 detected by the antennas 16 from these scattering centers. That may cause the detected signals 30 to exhibit dissimilar interference characteristics for the signals from the scattering centers of the objects due to the fact that the relative phase difference changes across the plurality of antennas 16. This leads to different range profiles and Doppler profiles across the plurality of antennas 16, and increases the probability to get instantaneous multiple spectral peaks and nulls if the detection strategy is based on an 'or-logic' comparison of the single-channel or individual signals. Depending on the number of elements in the plurality of antennas 16, this detection concept improves detection and discrimination of nearby scattering centers. By contrast, NCI based detection suppresses the position difference effect of scattering centers by averaging out the spectrum difference across the detected signals 30, which makes nearby scattering center resolution and discrimination more difficult.

Applicant's prior system described in U.S. patent application Ser. No. 14/277,894 filed 15 May 2014 applies a composite detection strategy based on NCI spectrum together with a single receive channel spectrum analysis using 'or logic' in order to improve automotive radar range, range rate, and angle measurement resolution, and enhance system performance for near targets discrimination, target imaging, and lateral range rate estimation. A time delay between transmitted and received signals as well as the frequency shift due to Doppler effect is used to compute radial distance (e.g. r1 and/or r2 in FIG. 1) and relative velocity of a detected object, e.g. the first object 24A or the second object 24B, respectively. The received signal-phase differences of the detected signals 30 are used to estimate the angle, i.e. Direction-Of-Arrival (DOA) of a detected object by applying various angle finding techniques or algorithms such as Monopulse, digital beam forming, or super-resolution.

Object detection by the prior system may be first done in the Range-Doppler (RD) frequency domain after applying a 2D-FFT algorithm to the detected signals 30, and then integrating the resulting range-Doppler spectrums non-coherently. Local maxima of the resultant NCI RD-image (or RD-spectrum) and their immediate adjacent neighboring spectrums are used and processed to detect object and determine its corresponding RD-coordinates including lateral position and longitudinal position of the object after applying the desired angle finding algorithm on the detection raw spectral data.

In certain situations, multiple objects could have nearly the same range and Doppler parameters. The range and Doppler differences between these objects can be smaller than RD-measurement resolution of the radar, which is mainly predetermined from signal waveform parameters like dwell time and sweeping frequency, i.e. modulation bandwidth. As result, these objects can appear as one local maxima of the NCI RD-image, and their discrimination will only depend on angle if they possess lateral span that is consistent with measurement resolution of the applied angle finding technique (i.e. antenna pattern beam width, configuration, and angle evaluation algorithm). That means, for relatively nearby targets with inadequate Doppler, longitudinal, and lateral separations, the performance of multiple targets discrimination is limited for NCI only RD-image based detection strategy.

For a specific radar system design, such a limitation in resolution and discrimination performance can be improved significantly if the detections strategy evaluates not only a composite NCI RD-image, but also each of the antenna signals on an individual basis, i.e. single receive channel RD-images. As described above, signals from two nearby scattering centers of an object or objects may interfere at the receive antenna element depending on signals relative phase difference between these scattering centers. This relative phase difference is a function of the lateral and longitudinal range separation (e.g. $\Delta rx$, $\Delta ry$) between these two scattering centers, and may not be equal across the plurality of antennas 16. This is especially true for automotive radar that operates at millimeter wave, 3.92 mm for example, which is much smaller than in the real world expected position difference between scattering centers. As a result, spectrums of the signals interference from these scattering centers should possess dissimilar profile between receive antenna-array elements, and show peaks and nulls at different range and Doppler frequencies for different antenna-array elements. An improved way to determine if the object 24 includes or is made up of more than one object, e.g. the first object 24A and the second object 24B.

The system 10 described herein may be used as part of an automated driving system that controls various aspects of the vehicle such as vehicle speed and/or automated braking. If a radar system installed in a host vehicle was unable to detect a nearby object such as a motorcycle directly forward of the host vehicle by discriminating the motorcycle from a larger, further away object detected by NCI, a semi-trailer in a travel lane adjacent the lane of the host vehicle, the speed control system may undesirably accelerate the host vehicle toward the motorcycle. That is, the larger signal reflected from the trailer may disturb and/or mask the smaller signal reflected from the motorcycle if they are near to each other in range and/or have similar range rates. In such cases, the NCI detects only one peak within a broad spectrum. Since the two objects are in adjacent lanes, the system 10 may determine only one angle tending to be for the larger signal and not be able to discriminate the angle of one object from the angle of the other, especially at longer ranges due to limited angular resolution of the angle finding technique used. This is an example of why near target discrimination on the range profiles and/or Doppler profiles or range-Doppler images is advantageous to reliably track objects the host vehicle lane.

Referring again to FIG. 1, a non-limiting example of the system 10 includes a plurality of antennas 16 configured to detect a reflected radar signal 20 reflected by an object (24A, 24B) in a field-of-view 22 of the system 10, wherein each antenna (e.g. the first antenna 16A and the second antenna 16B) of the plurality of antennas 16 is configured to output a detected signal (e.g. the first signal 30A and the second signal 30B) indicative of the reflected radar signal 20 detected by each of the antenna 16A, 16B, . . . . The controller 26 is generally configured to receive the detected signals 30 from the plurality of antennas 16, determine if an object 24 is present in the field-of-view 22 based on the detected signals 30, and determine if the object 24 includes more than one object (e.g. the first object 24A and the second object 24B) based on an analysis of phases of the detected signals 30.

The controller 26 may include a receiver 29 configured to receive an antenna signal (e.g. the first signal 30A and the second signal 30B) from each antenna (e.g. the first antenna 16A and the second antenna 16B) corresponding to the reflected radar signal 20 that was detected by each of the plurality of antennas 16. The controller 26 may include a mixer (not shown) and a local oscillator (not shown) in order to demodulate the detected signals 30. The mixer and the local oscillator may be part of the receiver 29.

Radar signals reflected by two nearby scattering centers of a target or targets formed of multiple objects interfere with each other to some degree at the antennas 16. The degree of interference depends on a relative phase difference between the various reflected radar signals from each object. This relative phase difference is a function of the lateral and longitudinal range separation between the two scattering centers, and cannot be equal across all of the antennas 16. As such, the phase spectrums of the interfered signals have different profiles across the receive antenna-array elements (the antennas 16). Amplitude spectrums of different antenna-array elements can show peaks and nulls at different frequencies (i.e. ranges) depending on the relative position difference-to-wavelength ratio. Since some automotive radar systems operate at micrometer and millimeter wavelengths, 12.5 mm and 3.92 mm for example, the relationship of "relative position difference-to-wavelength ratio" makes the spectrum profile diversity across antenna-array elements relatively dynamic and sensitive to discriminate on-road near scattering centers of an object or objects. This sensitivity also depends on number of antenna-array elements, which creates opportunities to get multiple instantaneous peaks at multiple frequency bins, and thereby increases the probability of detection and discrimination of near scattering centers using single receive channel detection technique when compared to the NCI amplitude spectrum peak detection techniques. NCI could be used to average out spectrum diversity effects of the variance of relative phase difference across receive antenna-array elements, and thereby degrade the detection and/or discrimination of a second nearby scattering center.

In cases where scattering centers position constellations result in uniform constructive interference across all receive antenna-array elements, the opportunity of receiving multiple instantaneous peaks at multiple frequency bins diminishes as the local amplitude spectrums of all receive antenna-array elements uniformly broadens and makes peaks at one and the same frequency bin only. This limits the performance improvement of near scattering centers detection and discrimination using amplitude spectrum peak evaluation technique even with the "or-logic" single channel detection technique. Specially, the degree of the performance limitation is significant for radars with small number of antenna-array elements as compared to radars with a greater numbers of antenna-array elements. Such a performance limitation is also often the case for near scattering centers with significant RCS difference. For example, a pedestrian near to an automobile, or motorcycle near to a tractor-trailer could experience up to 30 dBsm RCS difference. The spectrum of the larger target can mask the spectrum of the smaller target for all receive antenna-array elements, and makes amplitude spectrum peaks detection technique ineffective.

Typically, complete extraction of information from signals reflected by scattering centers requires a complex spectrum evaluation technique. Since the relative position difference between scattering centers is embedded in the superposed signal phase term, phase spectrum evaluation technique should still provide information about presence of near scattering centers, and overcome performance limitations by the amplitude spectrum peak detection technique for scenarios discussed herein.

In addition, a typical automotive radar sensor has limited capability to classify or categorize on road targets to distinguish, for example, a pedestrian from a vehicle by tracking the micro Doppler effect of pedestrian's motion. The pedestrian's micro Doppler detection depends on amplitude spectrum peak detection technique on the Doppler frequency domain. As in the above sections discussed, the performance limitation of amplitude spectrum peak detection technique due to signal interferences of multiple scattering centers degrades also the micro Doppler effect detection and then the tracker's limited capability to classifying pedestrian from objects like a vehicle.

The local phase spectrum evaluation technique proposed herein reinforces the radar tracking capability of classifying or categorizing targets by evaluating fluctuation of the phase difference with time. Depending on radar object geometry and motion profile, the phase difference fluctuates in time domain as far as scattering centers are in continuous motion and trigger relative position variance with time in the order of fraction of the millimeter wavelength (e.g. 3.92 mm). Therefore, the time domain variance of the slope of the phase difference provides further information that can be employed to classify from radar detected on-road objects in to various categories.

Figure 2:
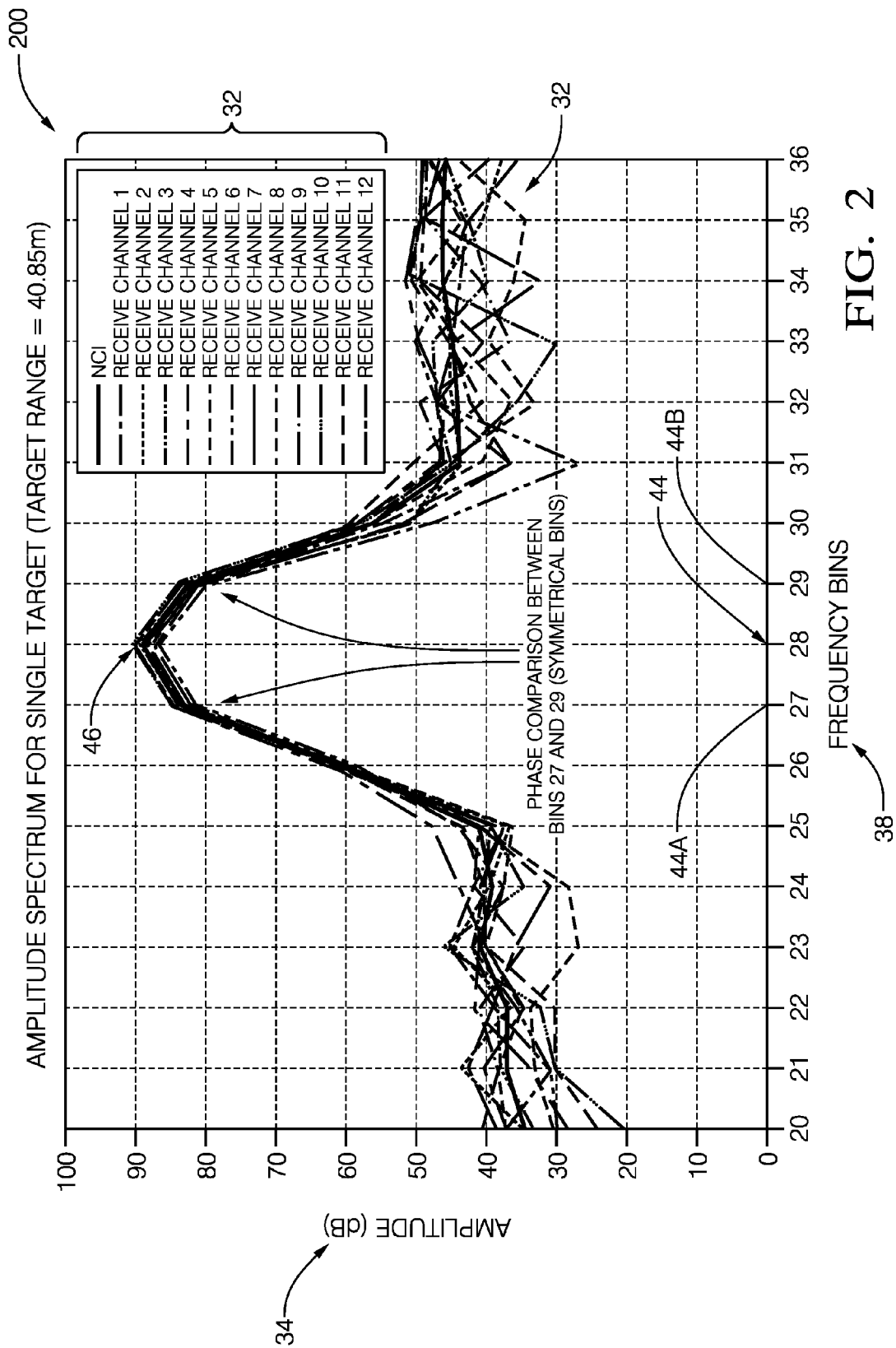
FIG. 2 is a graph of data from the system of FIG. 1 in accordance with one embodiment.
Figure 3:
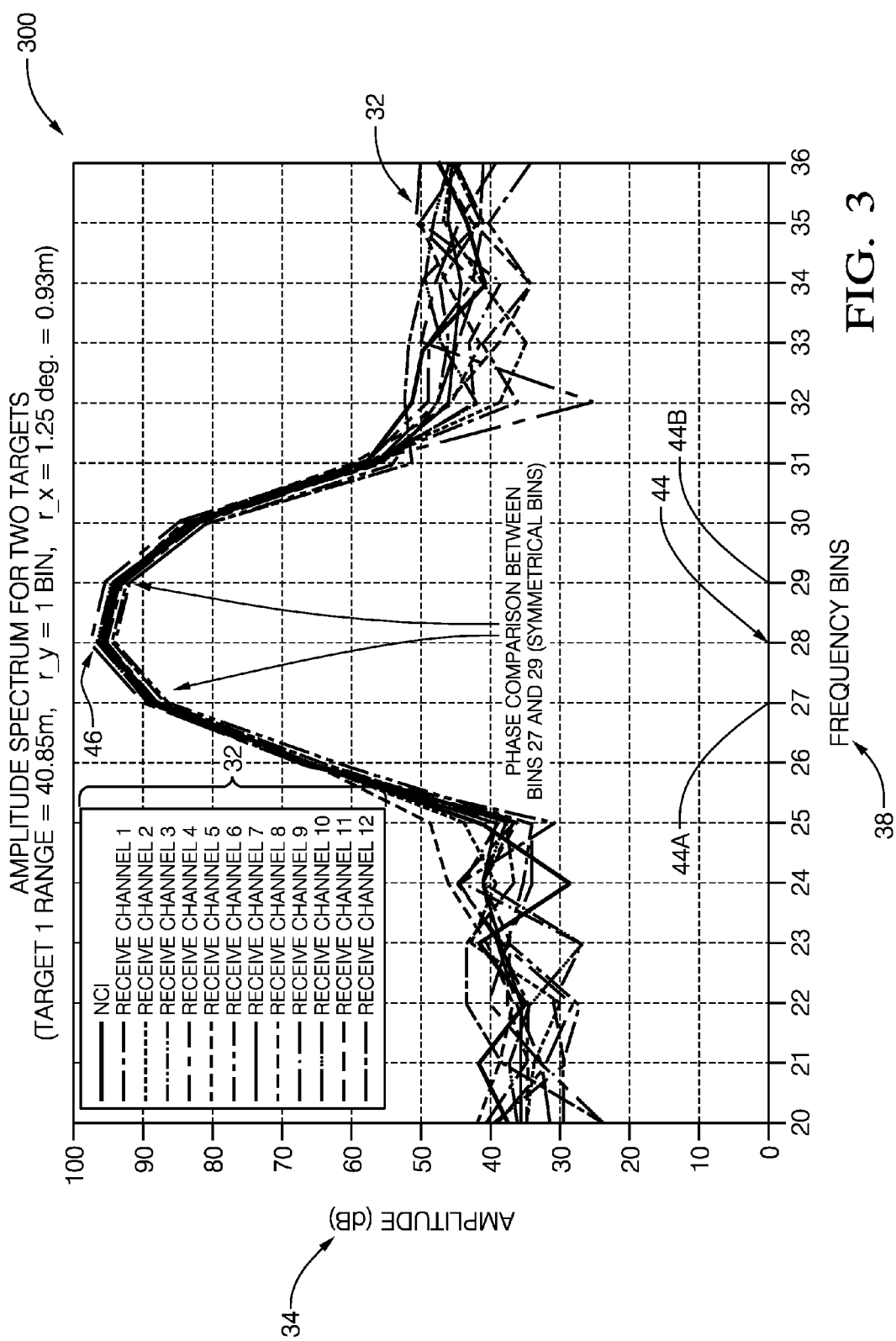
FIG. 3 is a graph of data from the system of FIG. 1 in accordance with one embodiment.

FIGS. 2 and 3 are non-limiting examples of a graph 200 and a graph 300 that illustrate examples of data stored in the controller 26 of the system 10. The data in FIG. 2 corresponds to a reflected radar signal from a single object with a radar cross section (RCS) comparable to a single passenger vehicle. In contrast, the data in FIG. 3 corresponds to a reflected radar signal from a two close together objects with a radar cross section (RCS) comparable to two passenger vehicles or two scattering centers from the rear corners or the rear and the front of a single passenger vehicle.

The detected signals 30 are typically time-domain signals that the controller 26 samples and performs a frequency transformation (e.g. a Fourier transform) to generate frequency profiles 32 of each of the detected signals, e.g. the first signal 30A and the second signal 30B. FIGS. 2 and 3 illustrate the amplitude portion 34 of the frequency profiles 32 arising from the frequency transformation. Those in the art will recognize that a frequency transformation of radar reflections arising from certain types of emitted radar signals will indicate range to a target. Those in the art will also recognize that frequency transformations may also generate phase information, see FIGS. 4 and 5, which are discussed in more detail below. In both cases (FIGS. 2 and 3), the amplitude portion 34 does not appear to be particularly useful to determine if the object 24, which is located at about forty-one meters (41 m) of range and which corresponds to frequency bin #28, is a single point reflection (e.g. only the first object 24A), or multi-point reflection (e.g. the first object 24A and the second object 24B).

Figure 4:
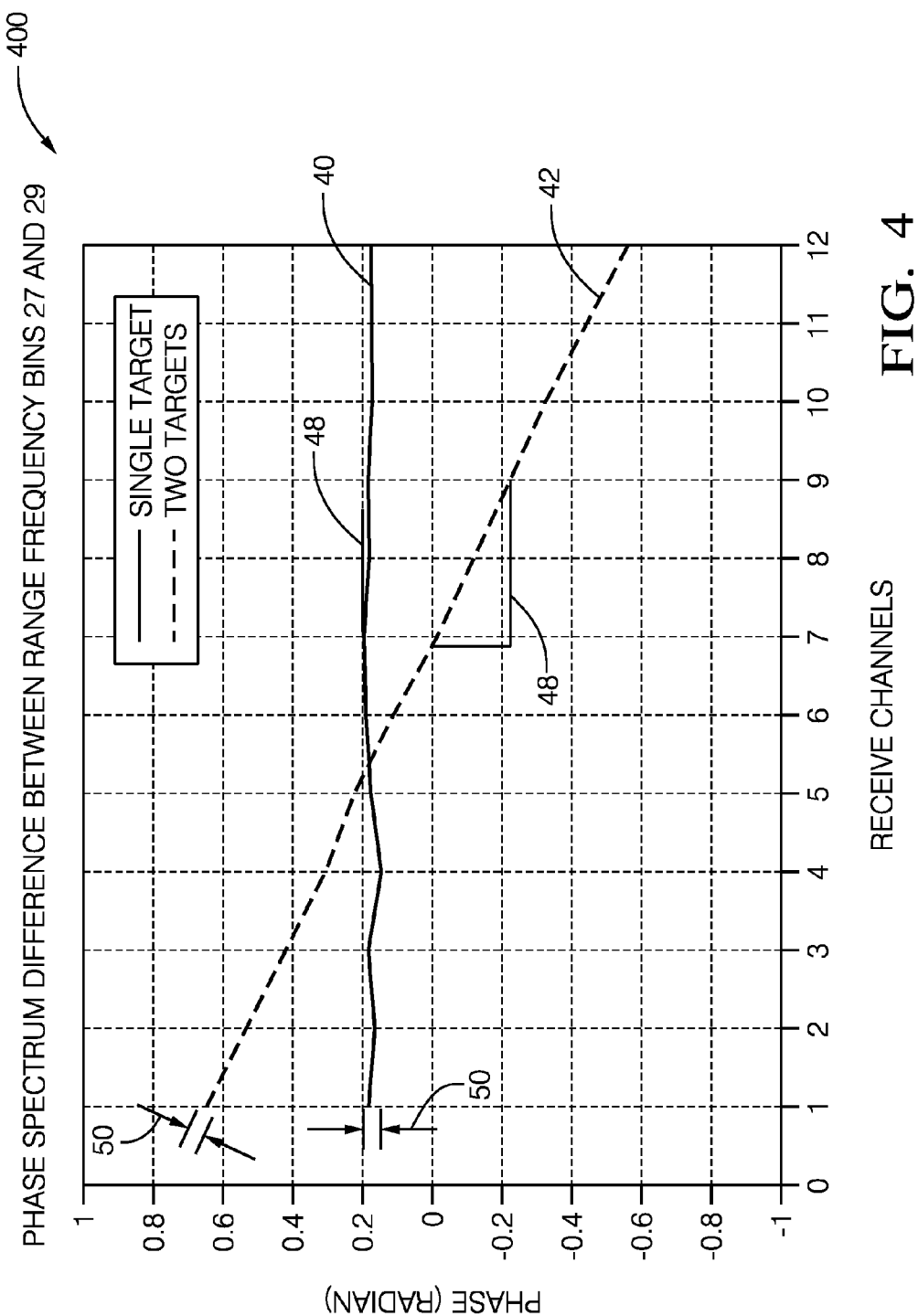
FIG. 4 is a graph of data from the system of FIG. 1 in accordance with one embodiment.
Figure 5:
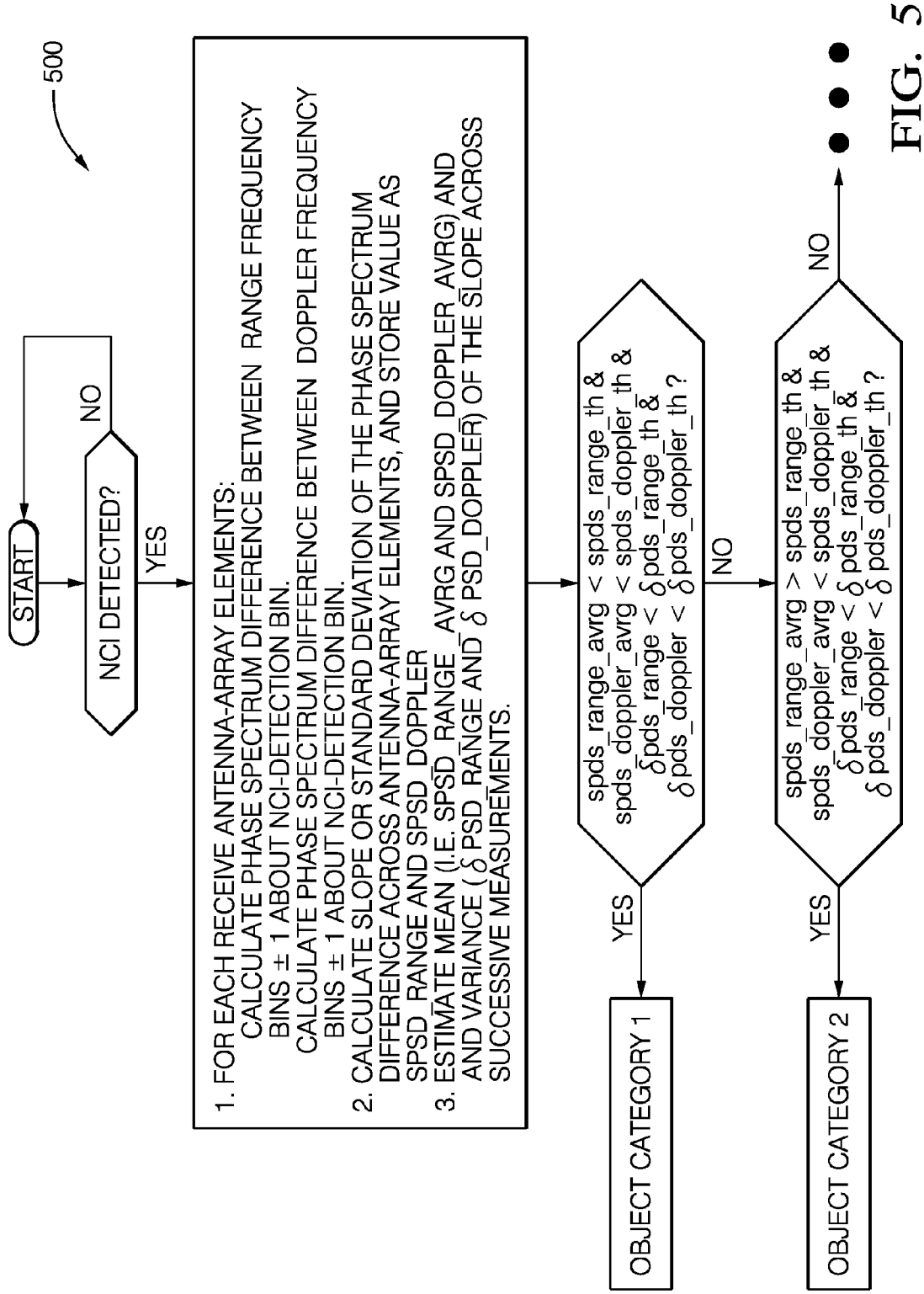
FIG. 5 is a flowchart of a method processing radar signals by the system of FIG. 1 in accordance with one embodiment.

Accordingly, the controller is advantageously configured to determine the frequency profiles 32 of each of the detected signals 30. As discussed above, the frequency profile for each of the detected signals 30 includes both an amplitude portion 34 as illustrated in FIGS. 2 and 3, and includes a phase portion 36 (FIGS. 4 and 5). Each of the frequency profiles 32 includes a plurality of amplitude values and phase values associated with frequency bins 38 that correspond to an amplitude sample and phase sample of a particular frequency profile at a particular frequency. As will be recognized by those in the art, the frequency bins 38 correspond to a range to a potential target, and the amplitude of the frequency profiles 32 is an indication of the amount of radar signal reflected at a particular range. As such, if the amplitude portion 34 of the frequency profile is relatively high, greater than 60 dB for example, it is an indication that a target is present at or near a range or distance that corresponds to the frequency bin with the greatest value of the amplitude portion 34. In FIGS. 2 and 3 the greatest value of the amplitude portion is at frequency bin #28 which corresponds to about forty-one meters (41 m) for this example.

In one embodiment, the frequency profiles 32 may be characterized as a range profile based on a frequency transformation (e.g. Fourier transform) of time-domain samples of the detected signals from all of the antennas. Alternatively, the frequency profiles 32 may be characterized as a Doppler profile based on a frequency transformation of a time-domain samples of the detected signals from all antennas. Which alternative is used is dependent on the modulation used for the radar signal 18, for example frequency modulated continuous wave (FMCW), Frequency Shift Key (FSK), continuous wave (CW), or Pulse-Doppler. All of these modulations schemes provide a time domain signal that can be time sampled and transformed into the frequency domain. What differs is what the frequency profile represents.

For example, a system that uses a series of a large number of FMCW waveforms (e.g. 64) with adequate number of antenna array elements may perform a 3D-Fourier transformation in various orders. The first time sample data transformation to frequency domain is to get range profile per chirp-pulse. For a given range frequency bin, it performs the second Fourier-transformation across multiple (e.g. 64) chirp-pulses in order to get the Doppler-profile. For a given range-Doppler frequency bin, it performs the third Fourier-transformation across antenna array elements to get an angle-profile (known as Digital-Beam-forming). It is noted that this kind of 3D-frequency transformation order to determine range, Doppler, and angle profiles is an example that can be also performed in different orders depending on the complexity for the intended applications.

Alternatively, a system that uses a relatively small number of FMCW waveforms (e.g. 2) with only two or three antenna array elements may be processed using a 1D-Fourier transformation only to transfer the time sample data to frequency domain using a Fourier-transformation, and then build a so called Doppler-range plane and applying a matching technique between up-and-down chirps per antenna element. The up-and-down chirps are FMCW waveforms with a positive and a negative slope, respectively. When an intersection between chirp frequencies domain signals is found, target detections are determined with a Doppler-range index at the intersection coordinate. After this is done for all antenna elements, a Monopulse technique (i.e. amplitude and phase comparison technique between antenna elements) is applied in order to get the angle of the detected target. For this technique, another frequency transformation stage is unnecessary.

Another alternative is to use a Pulse-Doppler waveform, which doesn't require performing Fourier-transformation on time sampled data to get range profile. Instead, so called range gates are defined as a function of sampling sequences, which immediately starts after a single pulse is completely transmitted. For example, range gate 1=ts1/(2C), range gate 2=ts2/(2C), . . . range gate N=tsN/(2C), where ts1, ts2, tsN are $1^{st}$, $2^{nd}$, . . . $N^{th}$ sampling time after a single pulse is transmitted. This is performed repeatedly for a number of successive pulses. For a given range gate, it performs a Fourier-transformation on time sample data across number of pulses to determine the Doppler profile. Since this is done for each of antenna array elements, depending on the implemented antenna technique, it can apply different angle finding techniques (including Monopulse, digital beam forming, . . . ) to get the angle of the detected target in the specific range gate or bin and Doppler bin. That is, a Fourier transformation is performed to get a Doppler frequency profile as well as angle profile if the implemented antenna technique requires performing digital beam forming.

Radar operating with CW waveform (e.g. Police radar), does detect target's with the Doppler-profile. It is performing Fourier-transformation on time sample data to get the Doppler-profile. There is no range profile so no position estimation of detected objects is performed. So, as can be seen in the description above, all radars, regardless their waveform, transform the time sample data to frequency domain, and determine target's frequency profile regardless what it represents (range or Doppler or angle profile).

FIG. 4 illustrates a graph 400 of phase difference values, hereafter the phase-difference 40 and the phase-difference 42 associated with selected range bins (#27 and #29) for each of the detected signals 30 from each of the antennas 16. For a given NCI-detection of single scattering center of a target (e.g. FIG. 2) or multiple scattering center of target(s) (e.g. the max-NCI-bin 44 or the peak 46 at frequency bin #28 of FIGS. 2 and 3), the system 10 evaluates local phase spectrum between symmetrical frequency bins about NCI-detection (e.g. between bins #27 and #29 of FIGS. 2 and 3) according to steps shown in the flow-chart 500 given in the FIG. 5. The local phase spectrum evaluation is performed in range and Doppler frequency domains for NCI-detection with adequate SNR. Note that since this is a phase-difference evaluation technique (i.e. not absolute phase evaluation), it is not as susceptible to mismatch between antenna-array elements or other transients effects. However, it is recommended to apply this technique for detections only with adequate SNR. Phase in general is susceptible to noise, and results from phase-difference evaluation may not be reliable for detections with inadequate SNR.

For each receive antenna-array elements, the system 10 calculates the phase-differences between symmetrical frequency bins to generate the graphs of values shown in FIG. 4. Furthermore, the system 10 determines a slope 48 of the phase-difference 40, 42 and/or a variance 50 of the slope 48 of the phase-difference 40, 42 across receive-antenna-array elements (the antennas 16). By way of further explanation, assume that the estimated value of the slope 48 or the variance 50 (of the slope 48) of the phase-difference across receive antenna-array elements are represented by spsd_range and spsd_doppler for range- and Doppler-frequency domains, respectively. Also assume that spsd_range and spsd_doppler can be made available for object or target tracking algorithm as additional object parameters to existing standard object parameters list such as lateral and longitudinal positions, rate-of change of position, and signal amplitude.

In association with these listed object parameters, the tracker can evaluate means and variations of spsd_range and spsd_doppler across successive measurements (e.g. δspsd_range_avrg, δspsd_doppler_avrg, δspsd_range and δspsd_doppler). The system can then employ these various values for the purpose of object or target categorization. As an example, the flowchart 500 in FIG. 5 shows decision logic that could be used to categorize or group detected objects or targets to various categories of automotive radar on-road targets. It is a simplified version of composite comparison logic for the means and time-variations of spsd_range and spsd_doppler with predefined object category criteria or thresholds (e.g. spsd_range_th, spsd_doppler_th, δspsd_range_th, and δspsd_doppler_th). This can be utilized for categorizing objects with similar entity to same group.

Adding these from phase spectrum derived parameters (i.e. spsd_range and spsd_doppler) to standard from amplitude spectrum derived object or target parameters list will support the tracker developing not only a more complex and reliable decision logic for targets categorization but also help improving the performance for target kinematics prediction. Note that effect of signal interferences between near scattering centers can change detected object parameters from measurement-to-measurement, and cause significant error or noise on parameter prediction. Reliable object or target categorization may help the tracker to apply different parameter filter techniques for different object or target categories so that an improved object kinematics prediction is possible.

FIGS. 6A, 6B, 7A, 7B, 8A, 8B, 9A, and 9B are non-limiting examples of test data results for various automotive radar on-road targets. It confirms that target categorization is realistic using the target's size and motion profile dependent nature of the spsd_range and spsd_doppler. The logical combination of the range and Doppler spectral spreading can be utilized to associate various instances of the object 24 to the various radar object or target categories using the mean spsd_range and spsd_doppler and their variances between measurements at different times (i.e. δspsd_range and δspsd_doppler).

Figure 6A:
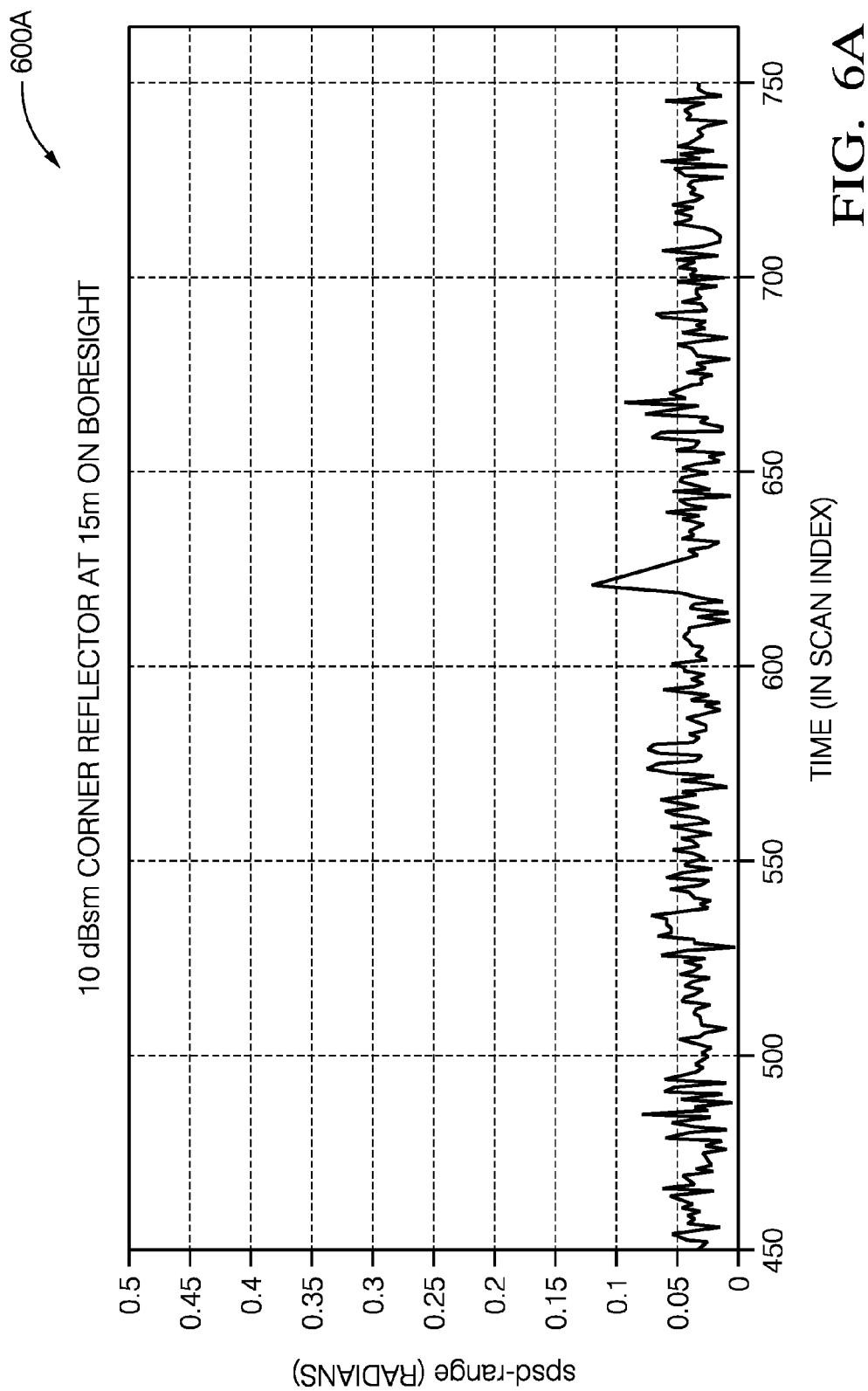
Figure 6B:
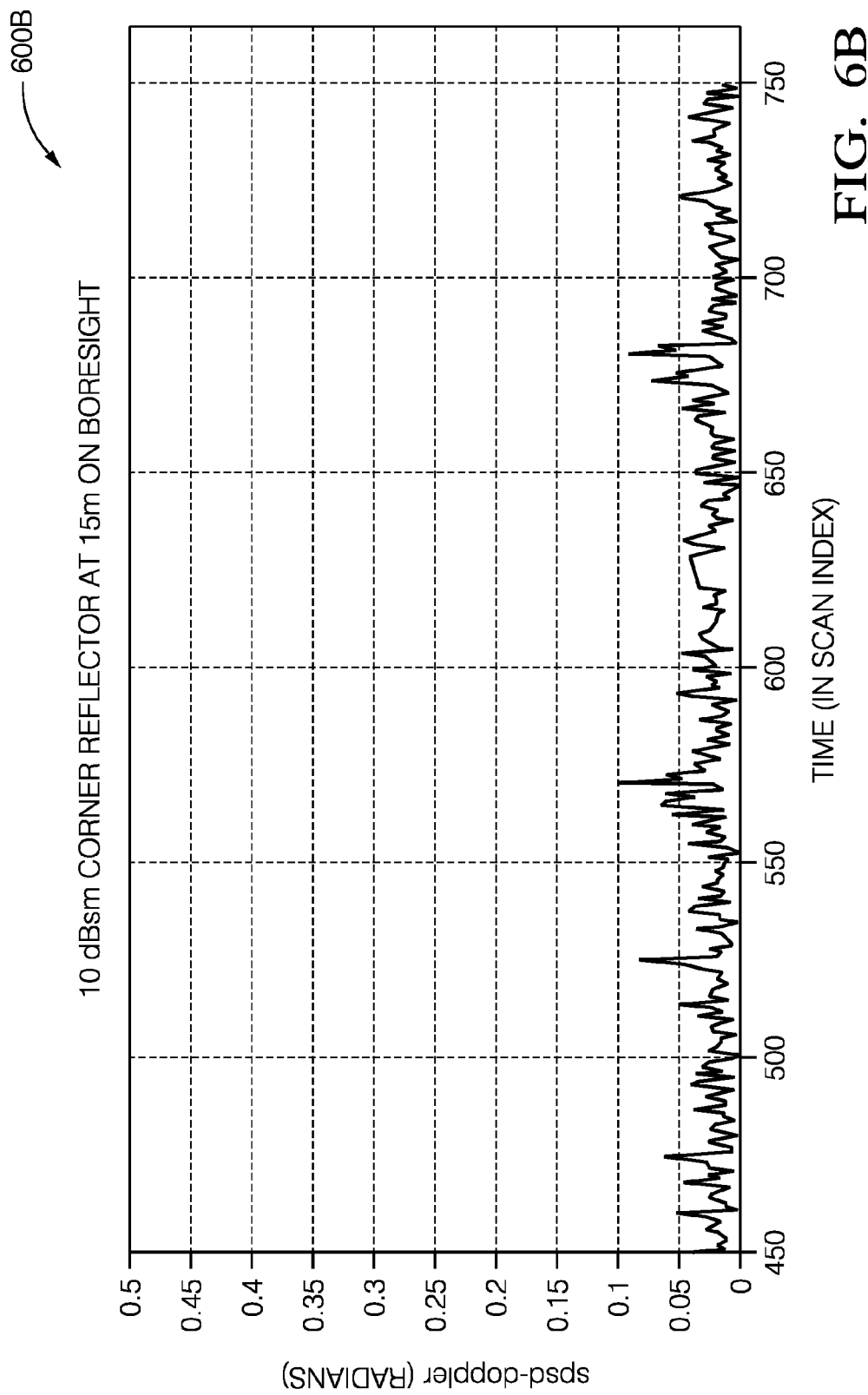

FIGS. 6A and 6B show examples of the spsd_range (graph 600A) and spsd_doppler (graph 600B) profiles for a corner reflector which is used as radar target with point or single scattering center. Because of uniform spectral spreading to surrounding frequency bins, the values of spsd_range and spsd_doppler are relatively small with minimum variance across successive measurements (i.e. instrumentation caused minimum variance). This implies that, for the purpose of radar-target categorization or grouping, single scattering center such as a stationary pedestrian can be associated with or characterized by smaller values of spsd_range and spsd_doppler, and minimum variance (i.e. δspsd_range and δspsd_doppler).

Figure 7A:
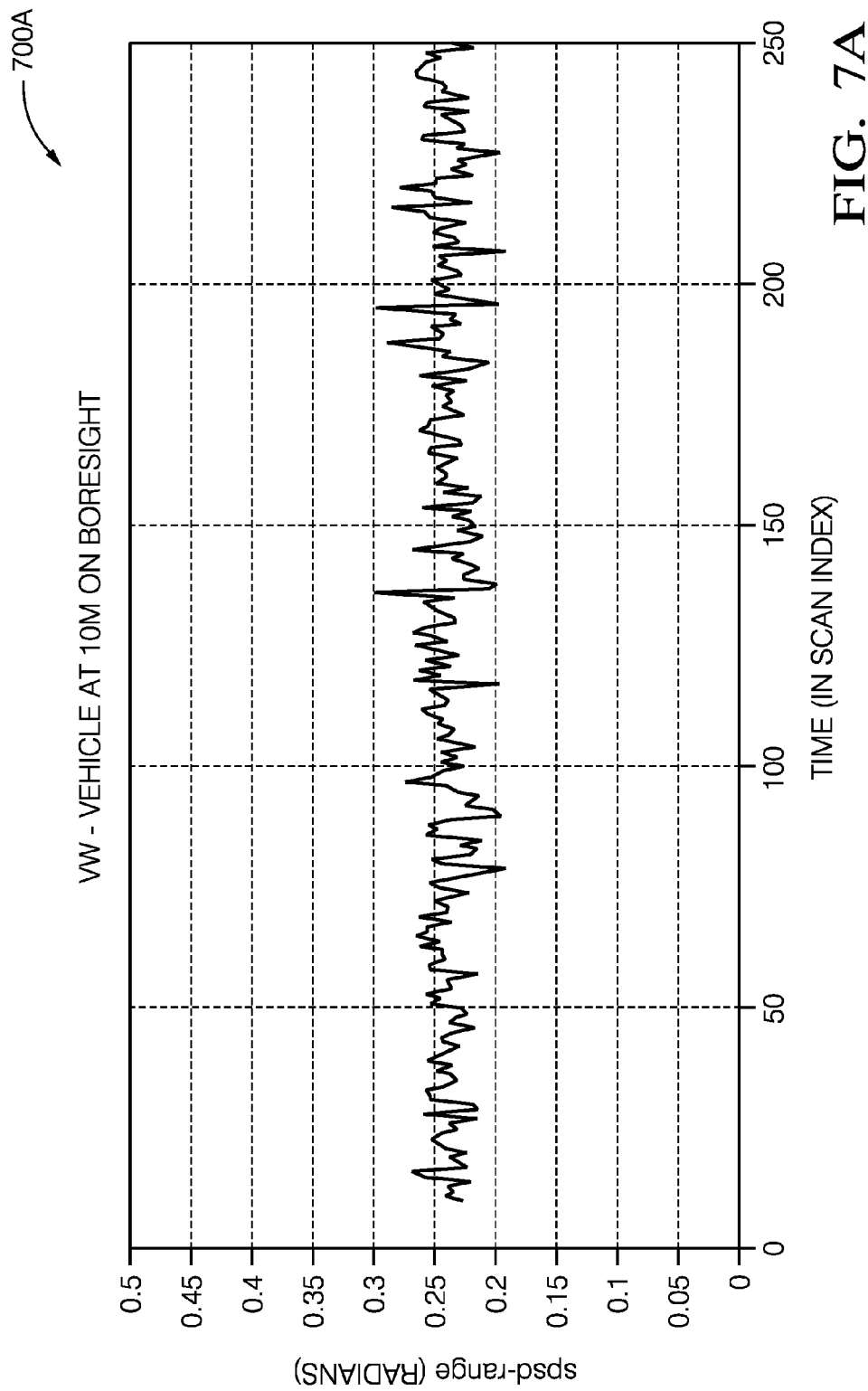
Figure 7B:
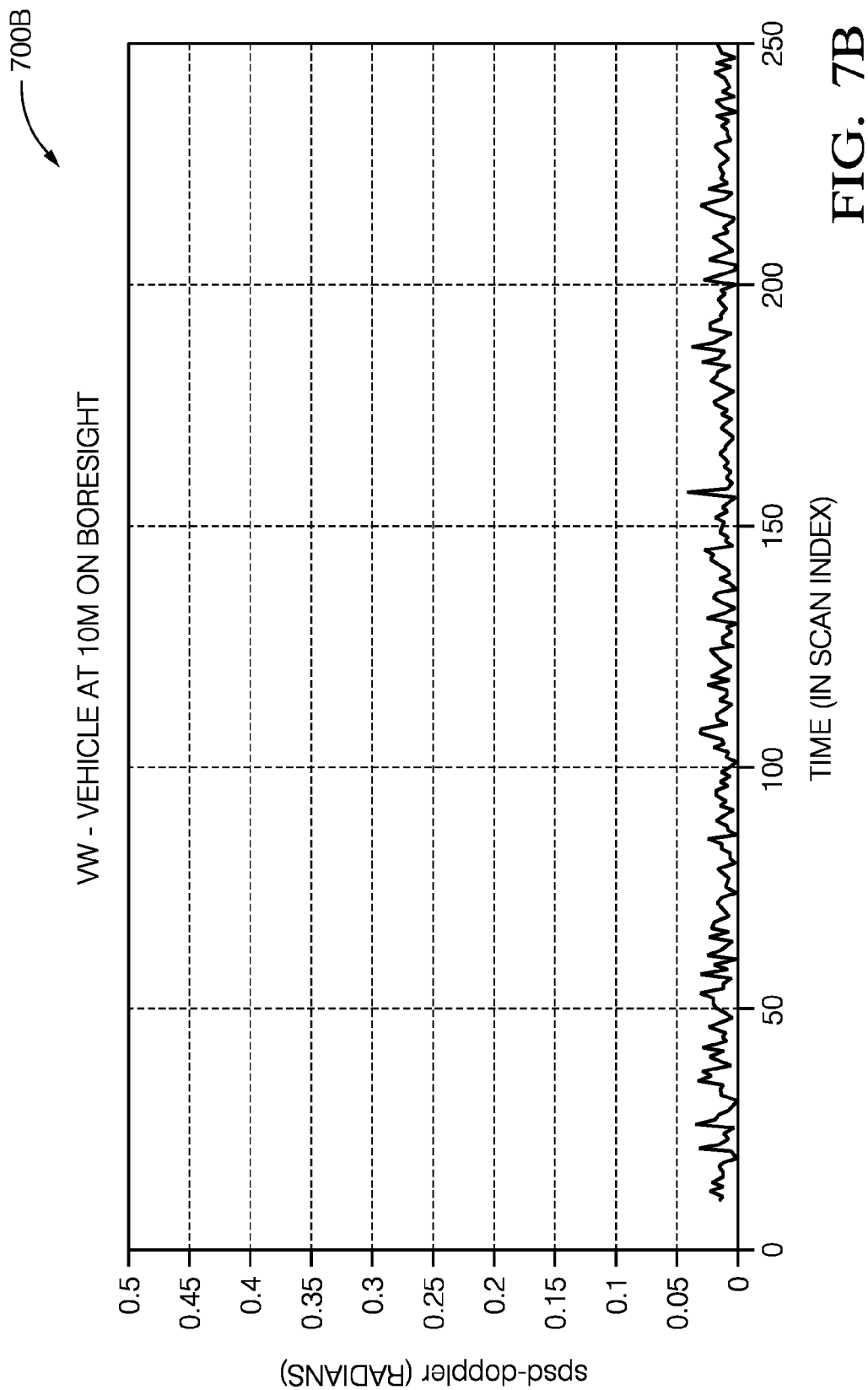

FIGS. 7A and 7B show non-limiting examples of the spsd_range (graph 700A) and spsd_doppler (graph 700B) profiles for a stationary Vehicle. The larger spsd_range indicates a target present with in-range direction distributed scattering centers due to in the longitudinal direction extended geometry of the Vehicle. The Vehicle possesses scattering centers along its geometry. Reflected signals from these scattering centers causes spectral spreading in range for radar system that has inadequate range resolution to discriminate these in range distribute scattering centers. The spectral spreading from such a radar target is typically unsymmetrical to the signal peak that belongs to scattering center from the rear portion of the Vehicle. As result, the local phase spectrum evaluation technique between symmetrical bins indicates a larger slope of phase spectrum difference spsd_range. Since the Vehicle is stationary and the distances between these scattering centers are relatively constant, there will be no non-symmetrical spectral spreading in the Doppler frequency as well as there will be no variance between measurements for the slope of phase spectrum difference spsd_range. Therefore, the smaller spsd_doppler and minimum variances δspsd_range and δspsd_doppler indicate that signals reflected from these distributed scattering centers are stationary. For the purpose of radar-target categorization or grouping, this can be used as indicator for a stationary in-range extended radar-target such as a Vehicle.

Figure 8A:
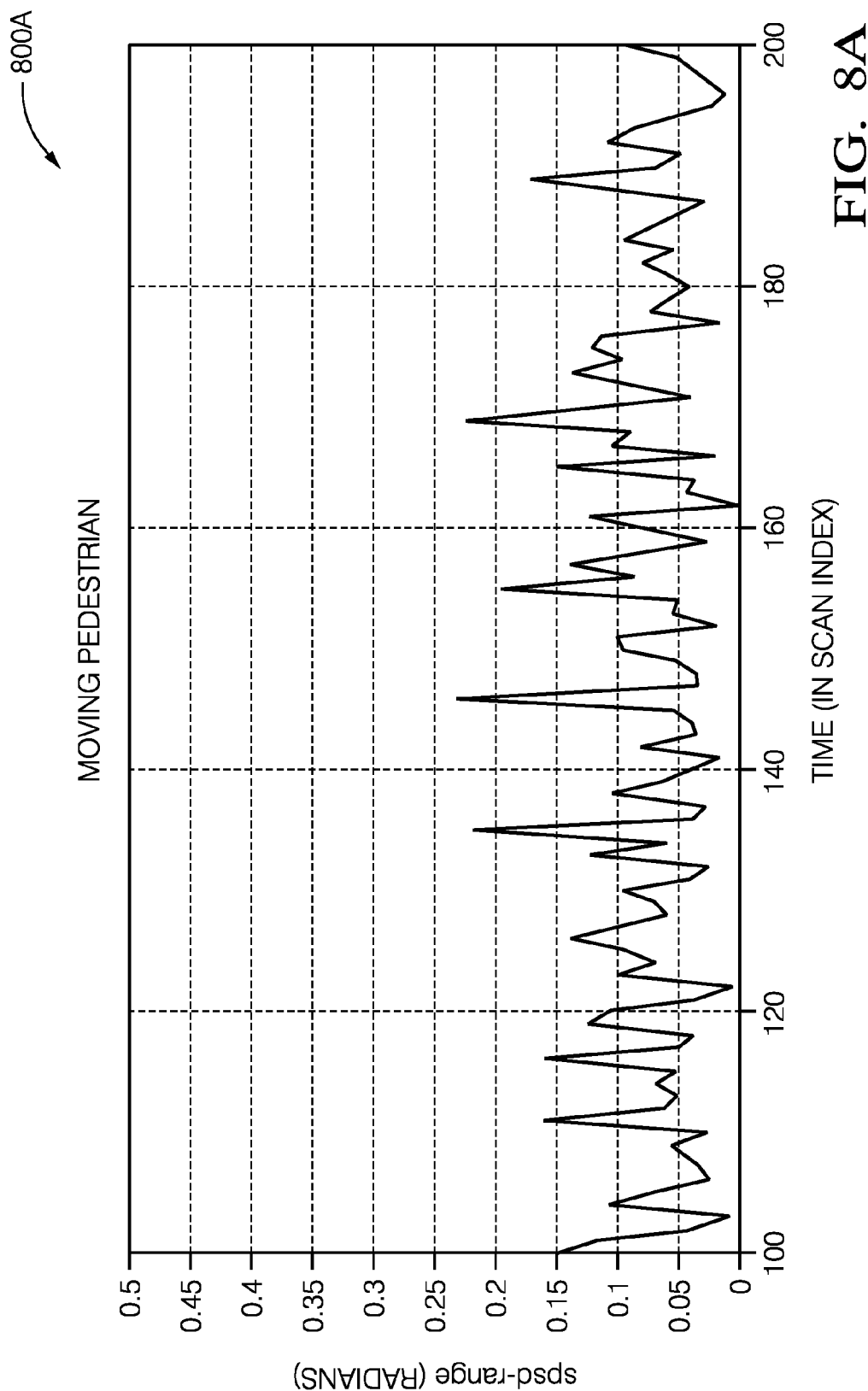
Figure 8B:
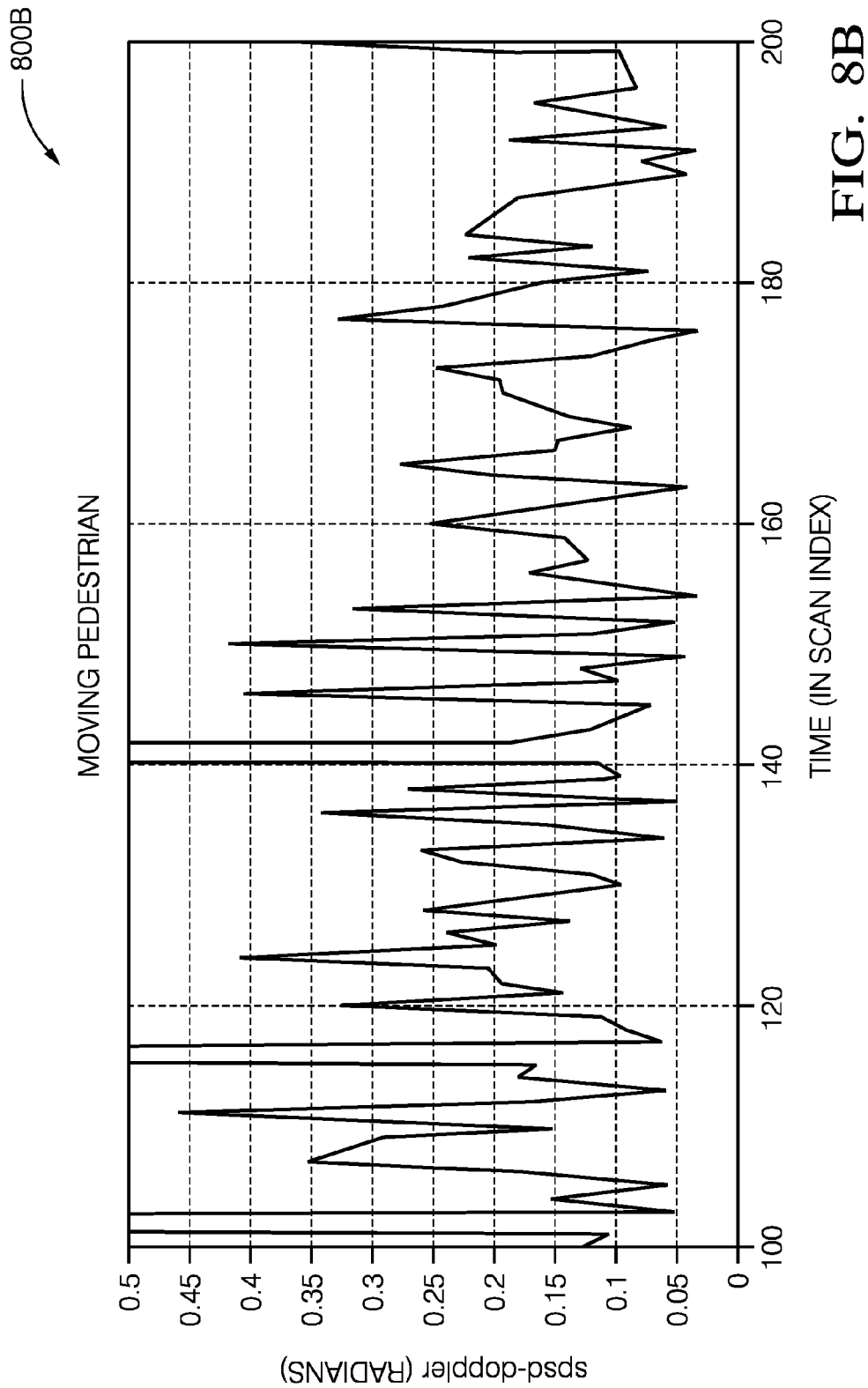

FIGS. 8A and 8B show another non-limiting example for a moving Pedestrian like radar-target (the object 24). Both spsd_range (graph 800A) and spsd_doppler (graph 800B) are significantly fluctuating across successive measurements (i.e. moderate δspsd_range and δspsd_doppler). This is an indication for range and Doppler spectral spreading due to non-stationary reflections from distributed near scattering centers of the Pedestrian's legs, hands, and torso. For the purpose of radar-target categorization or grouping, moderate variance in both spsd_range and spsd_doppler can be associated with or corresponds to a moving Pedestrian like on-road radar-targets.

Figure 9B:
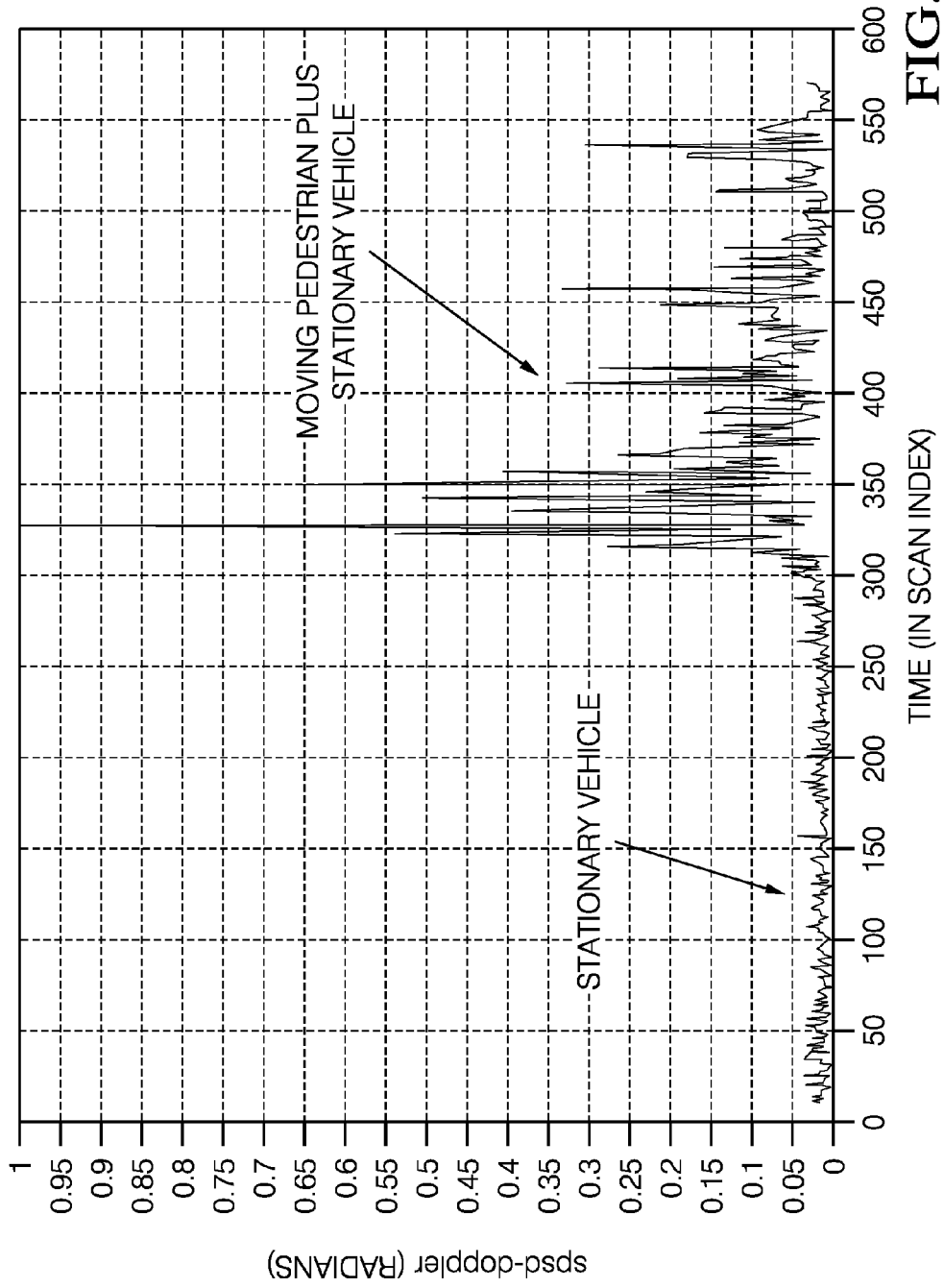

Finally, FIGS. 9A and 9B show graph 900A and graph 900B, respectively, as data from another example radar-targets category for moving Pedestrian like targets around stationary Vehicle. For the first three-hundred scan indexes, spsd_range (graph 900A) and spsd_doppler (graph 900B) are similar to profiles shown in FIGS. 7A and 7B as an example for a stationary Vehicle. For a scan index value greater than about 300, a moving pedestrian enters close proximity of the Vehicle, and causes spsd_range and spsd_doppler to fluctuate for the same reason discussed above with regard to FIGS. 8A and 8B. The variances (i.e. δspsd_range and δspsd_doppler) across successive measurements of spsd_range and spsd_doppler are now stronger than the pedestrian only case. This is due to non-uniform and non-stationary spectral spreading in both the range-domain and the Doppler-domain as result of interference between distributed multiple near scattering centers from the moving Pedestrian and stationary Vehicle. For the purpose of radar-target categorization or grouping, such strong δspsd_range and δspsd_doppler in combination with the larger spsd_range but smaller spsd_doppler will help to predict multiple non-stationary near targets category. In this case, for example a moving pedestrian with spectrum spreading in both range- and Doppler-domain can be separately grouped from a stationary Vehicle with spectrum spreading in range—but not in Doppler-domain.

Note that all these object or target categories are examples to show the applicability of the local spectrum evaluation technique for automotive radar-targets categorization purpose. It will improve the tracker performance for targets categorization and/or classification if these local phase spectrum parameters of a detected object combine with amplitude spectrum derived standard object parameters and form a more robust categorization criteria or decision logic.

As it is discussed above, the tracker function of prior automotive radar systems uses a standard object parameters list in order to analyze their time-domain quantitative behaviors and make prediction on instantaneous object kinematics and its category or class. Examples of standard object parameters are signal amplitude, lateral and longitudinal positions and rate-of-change of positions. These object parameters are derived from amplitude spectrum, and can be easily affected by signals interference from multiple near scattering centers. As result, it degrades the tracker performance for reliable object kinematics prediction and categorization.

In order to improve the prior tracker performance limitations, the system 10 described herein introduces a local phase evaluation technique that adds the slope 48 and/or the variance 50 (of the slope 48) of local phase-differences in the object detection parameters list. It provides additional information about object size and motion profiles, and can be evaluated and utilized by the tracker for object categorization purpose to the various on-road object groups. Reliable object or target categorization may help the tracker to apply different parameter filter techniques for different object or target categories so that an improved object kinematics prediction is also possible.

Accordingly, a system 10, a controller 26 for the system 10 and a method (the flowchart 500) are is provided. Improvements over prior examples are the result of applying the local phase spectrum evaluation technique on symmetrical frequency bins about max-NCI-detection. For both the range-domain and the Doppler-frequency domain, a phase-difference between symmetrical frequency bins about NCI-detection frequency bin for each antenna-array elements is computed. The slope of the phase-difference across antenna-array elements for successive measurement cycles is computed. The mean of the slope will depend on geometry of detected radar object(s) or target(s), and can be used to distinguish between single point radar-target (e.g. pedestrian and bicyclist) and in size extended radar-target(s) (e.g. Vehicle). The variance 50 of the slope across successive measurement cycles may also or alternatively be computed. The variance will depend on geometry and motion profile of detected radar object(s) or target(s). As such, it can be used to categorize the various automotive radar on-road object(s) or target(s). The slope 48 of the phase spectrum difference across antenna array elements and the variance 50 across multiple measurement cycles can be used to categorize automotive radar objects or targets. If object category is reliably known, the tracker can apply object guided parameter filter techniques to perform instantaneous object kinematics prediction and enhance overall object tracking performance. This is particularly relevant for laterally moving objects tracking or known as cross-traffic tracking such as pedestrian and bicyclist. Note that radar sensor is incapable of a direct lateral rate measurement of an object.

While this invention has been described in terms of the preferred embodiments thereof, it is not intended to be so limited, but rather only to the extent set forth in the claims that follow.

I claim:

1. A radar system suitable for an automated vehicle, said system comprising:
    a plurality of antennas configured to detect a reflected radar signal reflected by an object in a field-of-view of the system, wherein each antenna of the plurality of antennas is configured to output detected signals indicative of the reflected radar signal detected by each of the plurality of antennas; and
    a controller configured to
    receive the detected signals from the plurality of antennas,
    determine if the object is present in the field-of-view based on the detected signals,
    determine a phase-difference between symmetrical-frequency-bins for each antenna, wherein the symmetrical-frequency-bins are symmetrically offset from a maximum-amplitude non-coherent-integration detection-frequency-bin (max-NCI-bin), and
    determine a classification of the object based on a time-domain-analysis of the phase differences across the plurality of antennas.

2. The system in accordance with claim 1, wherein the time-domain-analysis is configured to determine a slope of the phase difference across antenna-array elements.

3. The system in accordance with claim 1, wherein the time-domain-analysis is configured to determine a variance of a slope of the phase difference across antenna-array elements.

* * * * *